United States Patent

[11] 3,587,569

[72] Inventor Lorrin H. Madsen
 Maple Plain, Minn.
[21] Appl. No. 767,243
[22] Filed Oct. 14, 1968
[45] Patented June 28, 1971
[73] Assignee American Rehabilitation Foundation, Inc.
 Minneapolis, Minn.

[54] DROP SEAT
 9 Claims, 9 Drawing Figs.
[52] U.S. Cl. .................................................... 128/33,
 128/70, 297/284
[51] Int. Cl. ...................................................... A61h 1/00
[50] Field of Search ........................................... 128/33, 73,
 376, 377, 378, 70; 297/284, 312; 5/91, 63, 81

[56] References Cited
 UNITED STATES PATENTS
2,460,245  1/1949  Summerville ................. 128/33

3,050,050  8/1962  Kubicek ....................... 128/33
 FOREIGN PATENTS
1,152,232  1963  Germany ..................... 297/284

Primary Examiner—Richard A. Gaudet
Assistant Examiner—G. F. Dunne
Attorney—Burd, Braddock and Bartz ABSTRACT: A mechanical drop seat having a vertically movable central seat member. A slide and lever mechanism connected to the central seat member is operated by a hand movable lever to selectively raise and lower the central seat member to vary the locations of the pressures on the posterior of a person.

The invention described herein was made in the course of, or under a grant with the Department of Health, Education, and Welfare.

INVENTOR.
LORRIN H. MADSEN

BY Burd, MacEachron, Braddock, Bartz & Schwartz
ATTORNEYS

INVENTOR
LORRIN H. MADSEN

BY Burd, MacEachron, Braddock, Bartz & Schwartz
ATTORNEYS

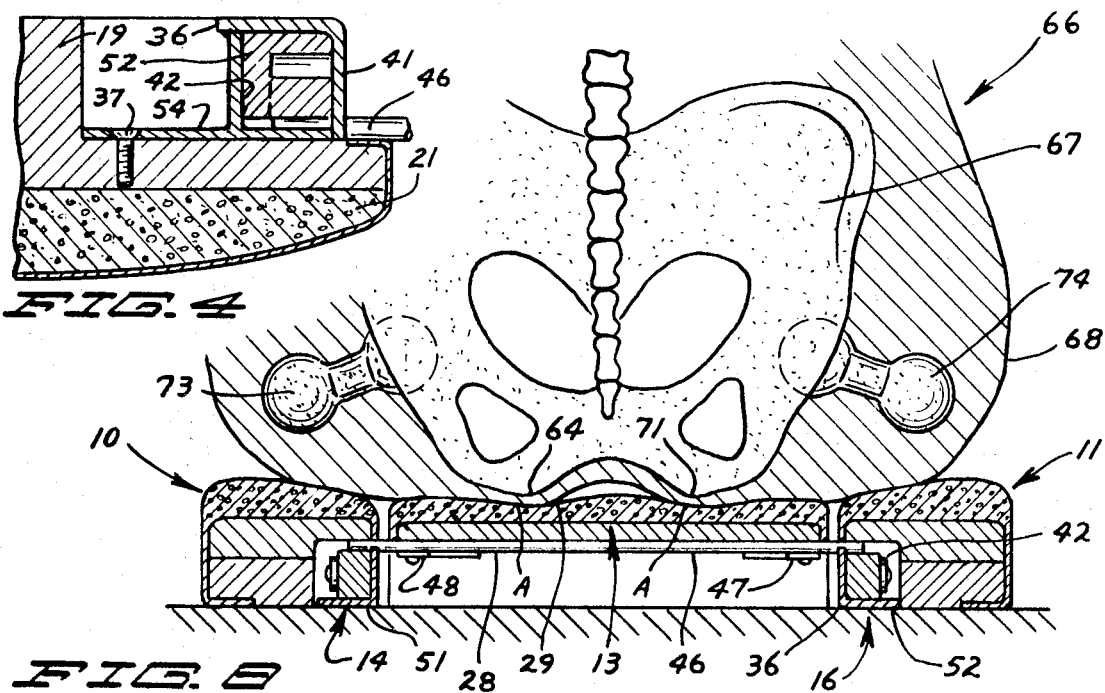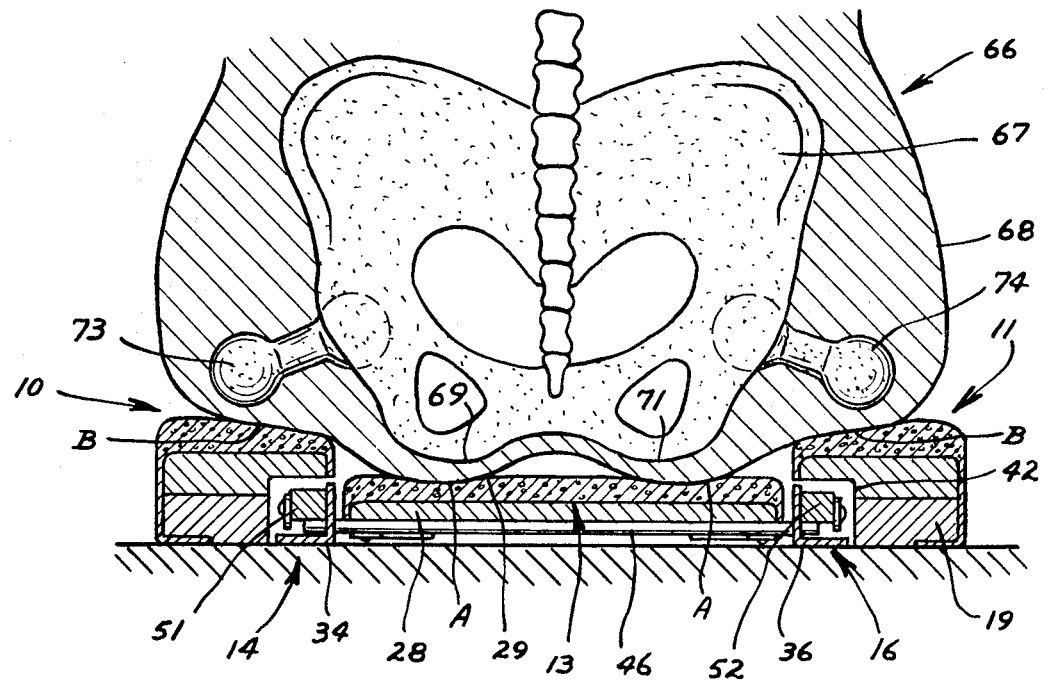

DROP SEAT

The invention described herein was made in the course of, or under, a grant with the Department of Health, Education, and Welfare.

BACKGROUND OF THE INVENTION

Paraplegics and others who must remain in sitting positions for long periods of time develop ischemic ulcers which may lead to sepsis, osteomyelitis, mutilating amputations, and often death. The ulcers usually occur over the weight bearing prominences covered by skin and very little fatty tissue or muscle. Areas most commonly involved are the ischial tuberosities and sacrum. The normal cellular metabolism is dependent upon an adequate blood circulation for receiving nutrients and eliminating metabolites. Prolonged obstruction of the local capillary circulation leads to the death of the cells. The obstruction of the capillary circulation is caused by compressive and shearing forces which compress the tissues between the supporting surface and the bony prominences and diagonally stretch the blood vessels to shut off the blood supply.

Many paraplegics and other similarly injured lack sensation which makes a person unaware of pressure which produces ulcers. The normal individual has a pain which causes him to move to relieve the pressure.

Many devices have been proposed to relieve and redistribute pressure from the potential areas of ulcer formation when patients are sitting or recumbent. The alternating pressure seat, shown in U.S. Pat. No. 3,050,050, is a seat having a movable slatted bottom to alternate the pressure on the patient's posterior. Contoured rubber pads inflated with air and covered with cotton cloth are being used to equally distribute the pressure to provide a minimum concentration of the pressure on the patient. Alternating pressure pads are used comprising two layers of inflated parallel tubes. The layers are disposed parallel with respect to each other and are alternately filled with air after a specified period of time. This structure requires a motor driven pump and control structure. The drop seat of the present invention is a manually operated seat which effectively redistributes the pressure under the ischial tuberosities to allow blood circulation thereby preventing the formation of ulcers.

SUMMARY OF THE INVENTION

The invention broadly relates to a seat having a movable portion for distributing and relieving the pressure under the ischial tuberosities of a seated person. The seat has a first member with a upper seat surface having an opening. A second member having a shape which conforms to the opening in the first member is located in the opening. A mounting means movably supports the second member on the first member. A mechanical control is operable by the person to selectively raise or lower the second member to shift the locations of the pressures on the posterior of the person.

BRIEF DESCRIPTION OF THE DRAWINGS

FIG. 4 is an enlarged sectional view taken along the line 4—4 of FIG. 3;

FIG. 8 is a transverse sectional view of the drop seat with the movable seat member in the up position showing the pressure points on the rear skeleton of a person seated on the drop seat; and FIG. 9 is a sectional view similar to FIG. 8 showing the movable seat portion in the down position to relieve the pressure on the ischial tuberosities.

Figure 1:
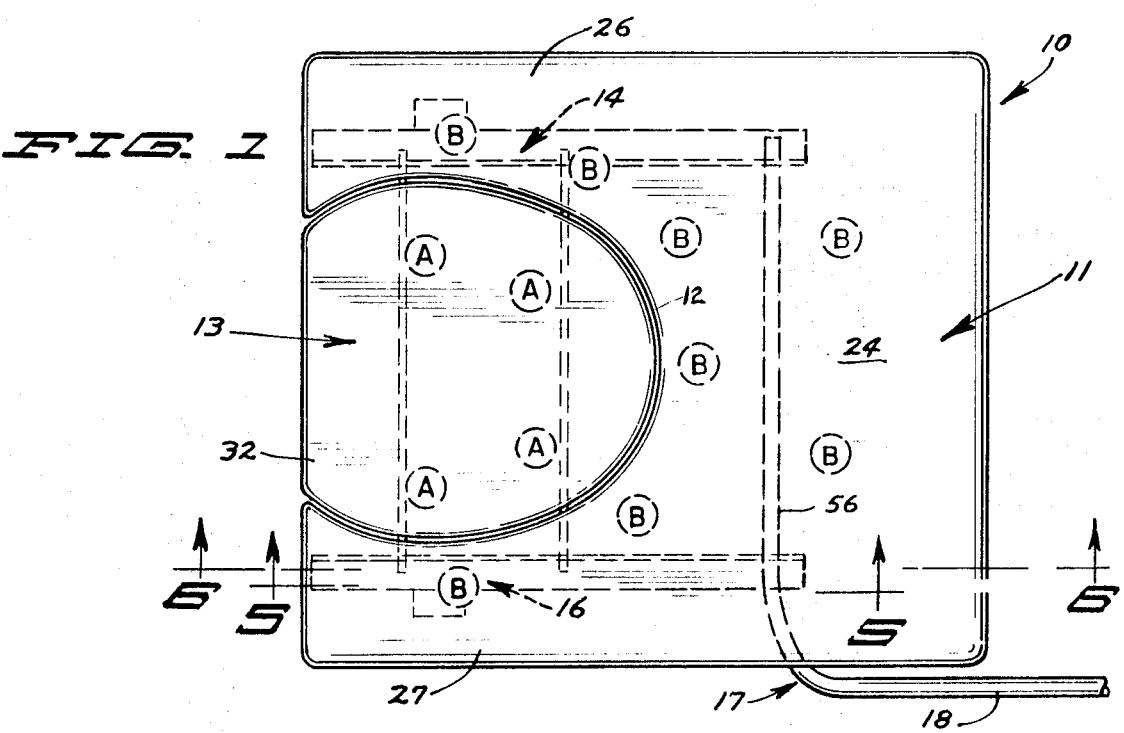
FIG. 1 is a top plan view of the drop seat of the invention showing the movable seat member in the up position.
Figure 2:
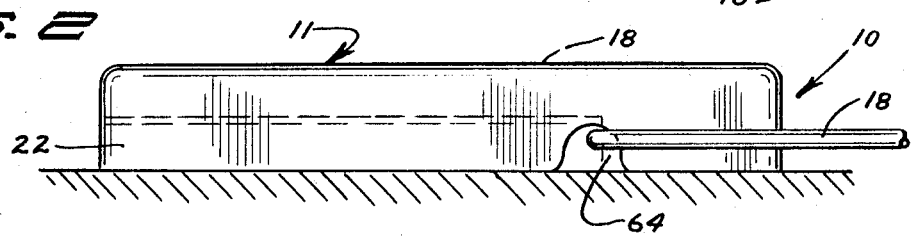
FIG. 2 is a side elevational view of FIG. 1.

Referring to the drawing there is shown in FIG. 1 the drop seat of the invention indicated generally at 10. Seat 10 has a first seat member 11 with an opening 12 and a second movable seat member 13 adjustably associated with the first seat member to shift or vary the locations of the pressures on the posterior of a person seated on the seat. The numerals A and B indicate pressure areas which vary with the position of the movable seat member 13 with respect to the seat member 11. Located on opposite sides of opening 12 and secured to the bottom of seat member 11 are mounts 14 and 16 supporting the movable seat member 13. The mounts carry a mechanical control indicated generally at 17 operable with a hand lever or crank arm 18 to selectively raise or lower the movable seat member.

Figure 6:
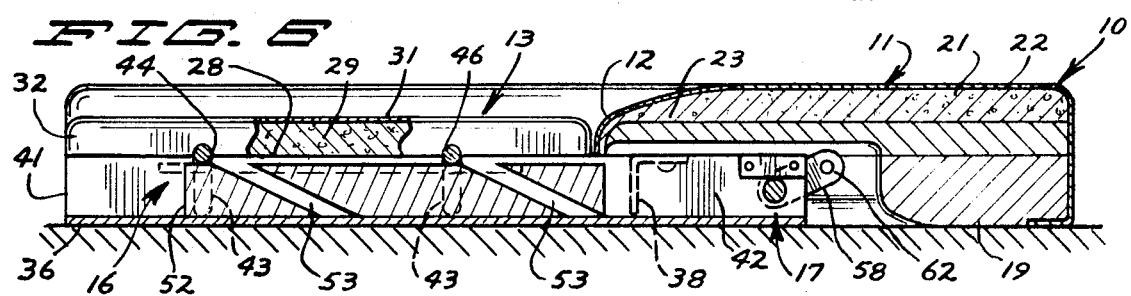
FIG. 6 is an enlarged sectional view taken along the line 6—6 of FIG. 1 showing the movable seat member in the up position.
Figure 7:
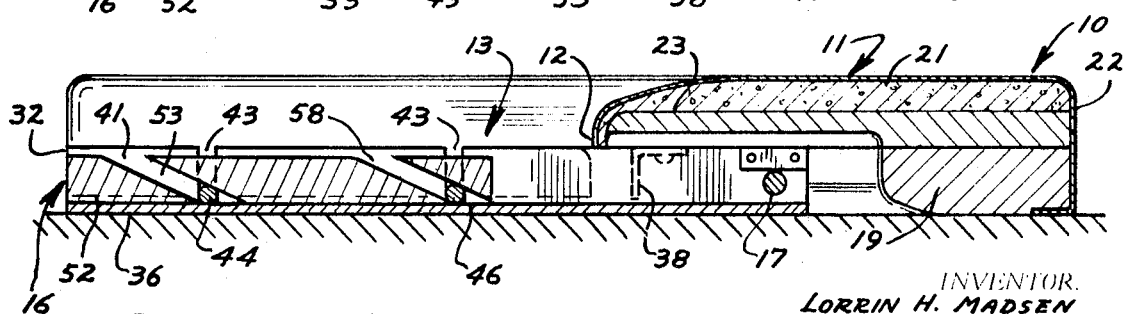
FIG. 7 is a sectional view similar to FIG. 6 showing the movable seat in the down position.
Figure 3:
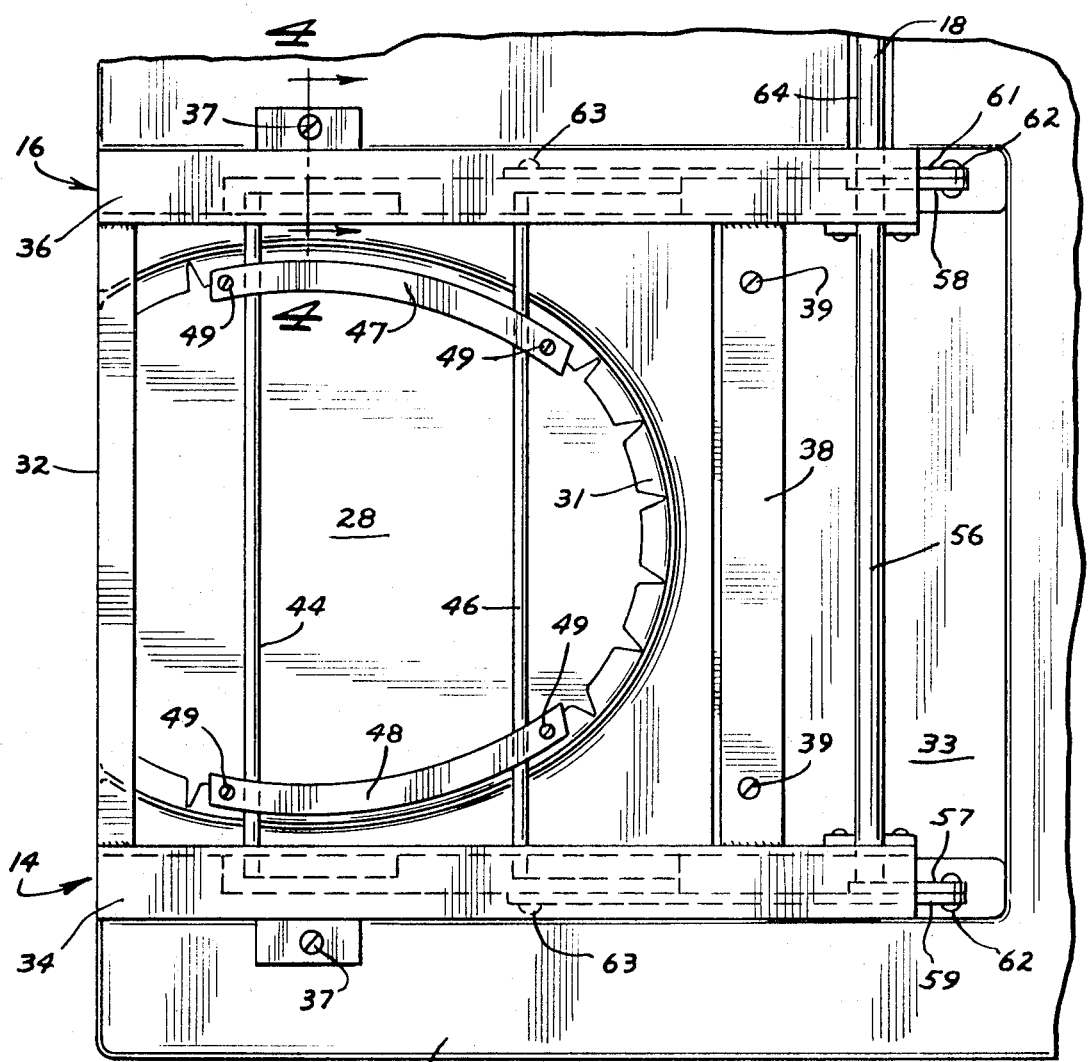
FIG. 3 is an enlarged plan view of the bottom of the drop seat of FIG. 1.

As shown in FIGS. 3, 6 and 7, the first seat member 11 has a generally flat U-shaped base 19. A resilient pad of yieldable sheet material 21 positioned over the top of the base is retained thereon by a pliable cover 22 which forms the seating surface of the first seat member. The portion of the seat surrounding the opening 12 is downwardly and inwardly inclined or sloped toward the opening 12. The first seat member 11, as shown in FIG. 1, is generally U-shaped having a generally rectangular shaped flat front section 24, and rearwardly extended side sections 26 and 27 located on opposite sides of the second seat member 13.

As shown in FIG. 6, the second seat member 13 has a flat base 28 which has the elliptical shape or generally arcuate U-shape of the opening 12. The base 28 is the cutout or blank from base 19 left over in the formation of the elliptical opening 12. The top of base 28 carries a resilient pad of yieldable sheet material 29. A cover 31 extends over the resilient pad 29 and is secured to the base 28. The second seat member 13 is a partially ellipsoid having a straight back side 32, as shown in FIG. 1 that fits into the opening 12.

Figure 5:
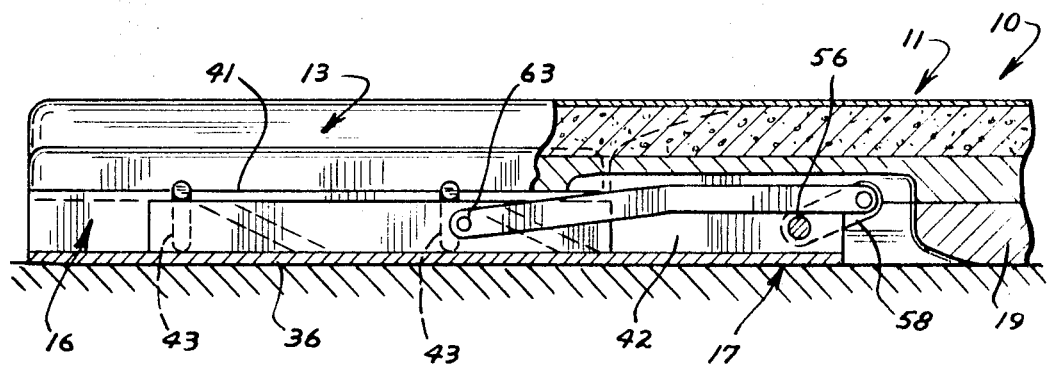
FIG. 5 is a fragmentary enlarged side view partly sectioned taken along the line 5—5 of FIG. 1.

The second seat member 13 is mounted in the first seat member for movement to an up position and a down position by the mounts 14 and 16. As shown in FIG. 3, the base 19 has a bottom recess 33 extended forwardly from the sides of the opening 12 into the forward portion of the base 19. The mounts 14 and 16 have angle members 34 and 36 secured to the base by fasteners 37 as screws, bolts and the like. The forward portions of the angle members 34 and 36 are secured together with a cross member 38 secured to the base 19 with fasteners 39. The mounts 14 and 16 are identical in structure. The following description will be limited to the mount 16. As shown in FIGS. 4, 5 and 6, the angle member 36 has an upright flange 41 spaced from the longitudinal side of the recess 33 to form a longitudinal passageway 42. The flange has a pair of spaced upright slots 43 which serve as upright guideways for the seat member 13. Secured to base 28 of the second seat member 13 are a pair of transverse rods 44 and 46 having ends which are slidably disposed in the upright slots 43. Opposite portions of the rods 44 and 46 are secured to flat plates 47 and 48. Fasteners 49, as screws and bolts, are used to attach the plates 47 and 48 to the bottom of base 28.

The mechanical control 17 is operable to raise and lower the second seat member 13 according to the requirements of the user. Mechanical control 17 comprises a pair of longitudinal slides 51 and 52 located in the passageways of the angle member 34 and 36 respectively. Each slide has a pair of forwardly and downwardly inclined grooves 53 which are forwardly inclined at an angle approximately 30° with respect to the horizontal plane of the seat 10. Other angles can be used for the grooves 53. Grooves 53 face the upright flanges 41 and slidably receive the ends of the rods 44 and 46 whereby longitudinal movement of the slides raises and lowers the rods 44 and 46 in the slots 43. The result is that the second seat member 13 moves to either the up or down position. The slides 51 and 52 are slidably retained in the angle members 34 and 36 by T-shaped brackets 54. As shown in FIG. 4, the T-shaped bracket 54 is secured to the ends of the flanges of the angle member 36 to provide the longitudinal passageway 42 for slide 52.

Returning to FIG. 3, the slides 51 and 52 are concurrently moved by a rotatable rod 56 extended transversely through holes in the forward end of the angle member 34 and 36. Secured to opposite portions of the rod 56 are forwardly directed arms 57 and 58. Links 59 and 61 pivotally connect the arms to the slides 51 and 52. Pivot pins 62 connect the arms 57 and 58 to the links 59 and 61 respectively. Pivot pins 63 pivotally connect the forward ends of the links to the slides. One end of rod 56 located in lateral groove 64 in base 19 is joined to the crank arm 18.

As shown in FIG. 6, when the crank arm is in the forward or down position, the slide 52 is in the forward position. The ends of the rods 44 and 46 rest on the top of the slide adjacent the slots 53 holding the second seat member 13 in the up position. In this position the top surface of the second seat member 13 is slightly below the top surface of the first seat member 11 so that a major portion of the weight of the person is resting on the second seat member 13. Referring to FIG. 7, crank arm 18 is moved upwardly and rearwardly forcing the slide 52 in a rearward direction. The ends of rods 44 and 46 are carried downwardly until they rest on the bottom flange of the angle member 36. In this position the upper surface of the seat member 13 is in the down position substantially below the top surface of the first seat member 11. In practice the second seat member 13 moves from 1 inch to 1½ inches between the up and down positions. The amount of vertical movement of the seat member 13 may be varied.

The following description is one example of a specific drop seat: The first seat member has a 15 inch square upper surface with a rearwardly directed elliptical opening having a straight transverse back. The area around the opening is slightly dish-shaped sloping toward the generally opening 12. The maximum dimension longitudinal and transverse of the second seat member 13 is 8 inches. The crank arm 12 is 1 foot long and operates with 1½ pounds of force to elevate a person seated on the drop seat. The lever rotates approximately 120° from its forward seat up position to its rearward seat down position.

In use, drop seat 10 may be placed on a chair, wheelchair or other supporting surface used as a seat support. As shown in FIGS. 8 and 9, a person seated on the drop seat is resting on both the first seat member 11 and the second seat member 13. FIGS. 8 and 9 show the posterior skeleton skin of a primate, indicated generally at 66, having pelvic bone structure 67 and the usual skin 68. The lower posterior portion of the pelvic bones form ischial tuberosities 69 and 71 which form abrupt edges. These edges create compression and shearing forces on the bottom tissue and skin which impedes and/or stops blood circulation in the adjacent tissue and skin. Projected laterally from the pelvic structure are the trochanter bones which form the upper part of the femurs. As shown in FIG. 8, with the second seat member 13 in the up position, the ischial tuberosities 69 and 71 compress the skin at points A when the greater part of the weight of the person is resting on the second seat member. The weight of the person at the points B adjacent the trocanters 73 and 74 is minimal allowing adequate circulation through the capillaries adjacent these bones.

As shown in FIG. 9, when the second seat member 13 is in the down position, the weight of the person is transferred to points B on the side portions of the first seat member 11. The pressure on the ischial tuberosities 69 and 71 is released thereby relieving pressure on the skin and tissue at points A.

Studies have shown that any pressure on tissue which transmits a lateral pressure of 32 mm. Hg. or more against the capillary wall will occlude the circulation and produce local ischemia. Prolonged pressure will produce an ulcer. When subjects were placed on the mechanical drop seat of the invention, with the movable center seat member in the up position, the mean pressure on the ischial tuberosities and the area posterior to the ischial tuberosities shown at A in FIG. 1 ranged from 56 mm. Hg. to 84 mm. Hg. When the center seat member 13 is moved to the down position, the pressures dropped to approximately 23 mm. Hg. which is below the 32 mm. Hg. which would stop capillary circulation. The pressures at the points B on the stationary seat member 11 varied conversely with the pressures at point A.

That is, when the movable center seat member 13 is in the up position, the pressures at point B were substantially lower than the pressures at point B when the center seat member 13 is in the down position as shown in FIG. 9. There was a generally good distribution of pressures all around the seat thereby minimizing any concentration of pressures on the tissue and skin.

While there have been shown and described a preferred embodiment of the drop seat of the invention, it is understood that various changes and additions may be made by those skilled in the art without departing from the spirit of the invention. For example, the seat may be a part of a chair, a wheelchair, or other seating device or the seat may be a separate member which is supported on a chair. The crank arm 18 may be located on either the right or left side of the seat. In addition, amount or the magnitude of up and down movement of the center seat member may vary according to the requirements of the user. The invention is described in the following claims.

I claim:

1. A seat comprising: a first member having a first upper seat surface and an opening in the seat surface, said opening having opposite sides and an entrance open to the back of the first member, a second member having a second upper seat surface separated from the first seat surface and located in said opening, said second upper seat surface being of a size and shape similar to the shape of the opening, means mounting the second member on the first member for selectively raising and lowering the second member in a generally vertical direction relative to the first member whereby the second surface moves selectively up and down relative to the first surface, said means mounting the second member on the first member comprising first means on the first member located along the opposite sides of the opening, movable means mounted on the first means for selected movement to a first position and a second position, second means secured to the second member mounting the second member on the first means for movement in a generally vertical direction, said second means having portions engageable with the movable means whereby on movement of the movable means to its first position the second member is raised and on movement of the movable means to its second position the second member is lowered.

2. The seat of claim 1 wherein the opening in the first seat surface is generally U-shaped and the second seat surface conforms to the opening.

3. The seat of claim 1 wherein the movable means comprise a pair of generally horizontal slides having upwardly inclined grooves, said portions located in said grooves so that linear horizontal movement of the slides selectively raises and lowers the second member.

4. The seat of claim 3 including a crank arm operably connected to the slides for moving the slides in a horizontal direction.

5. The seat of claim 3 wherein the portions are ends of transverse rods secured to the second seat member.

6. The seat of claim 1 wherein the first member has a generally flat front seat surface and rearwardly extended side seat surfaces, said opening being located between the side seat surfaces.

7. A seat comprising: a first member having a first upper seat surface and an opening in the seat surface, a second member having a second upper seat surface located in said opening, means mounting the second member on the first member for selectively raising and lowering the second member relative to the first member whereby the second surface moves relative to the first surface, said means mounting the second member on the first member comprising a pair of angle members secured to the first seat members along opposite sides of the opening, said angle members having upright slots, rods secured to the second seat member, said rods having ends projected through said slots, slides having inclined grooves movably positioned on the angle members, said ends of the rods extended into the inclined grooves and drive means for longitudinally moving the slides relative to the angle members whereby the second seat member moves relative to the first seat member.

8. The seat of claim 7 wherein the drive means comprises a transverse rod rotatably mounted on the angle members, and linkage means connecting the transverse rod to the slides whereby rotation of the rod moves the slides.

9. The seat of claim 7 wherein the opening has an entrance open to the back of the first member.